(12) United States Patent
Desbiez-Piat

(10) Patent No.: US 6,814,438 B2
(45) Date of Patent: Nov. 9, 2004

(54) METHOD FOR FITTING A RESILIENT HINGE OF A SPECTACLE FRAME AND RESILIENT HINGE DESIGNED FOR IMPLEMENTATION OF THIS METHOD

(75) Inventor: Christophe Desbiez-Piat, Rambervillers (FR)

(73) Assignee: Chevassus S.A., Morez (FR)

( * ) Notice: Subject to any disclaimer, the term of this patent is extended or adjusted under 35 U.S.C. 154(b) by 0 days.

(21) Appl. No.: 10/269,164

(22) Filed: Oct. 11, 2002

(65) Prior Publication Data

US 2003/0067583 A1 Apr. 10, 2003

Related U.S. Application Data

(63) Continuation of application No. PCT/IB01/00614, filed on Apr. 12, 2001.

(30) Foreign Application Priority Data

Apr. 14, 2000 (EP) .............................................. 00420074

(51) Int. Cl.[7] .............................................. G02C 5/22
(52) U.S. Cl. .......................... 351/153; 351/113; 16/228
(58) Field of Search ................................ 351/113, 114, 351/119, 121, 153; 16/228

(56) References Cited

U.S. PATENT DOCUMENTS 3,837,735 A * 9/1974 Guillet ........................ 351/113
5,483,302 A * 1/1996 Jaffelin ........................ 351/113
5,515,575 A * 5/1996 Pinazza ........................ 16/228

FOREIGN PATENT DOCUMENTS

| DE | 93 06 387.3 | 7/1993 | |
|---|---|---|---|
| EP | 0 340 161 | 11/1989 | |
| FR | 2 609 816 | 7/1988 | |
| FR | 2 664 990 | 1/1992 | |
| FR | 2694643 | * 2/1994 | ................. 351/153 |
| FR | 2 741 459 | 5/1997 | |
| GB | 2266783 | * 11/1993 | ................. 351/153 |
| WO | WO 97/45764 | 12/1997 | |
| WO | WO 98/43127 | 12/1998 | |

* cited by examiner

Primary Examiner—Huy Mai
(74) Attorney, Agent, or Firm—Sturm & Fix LLP

(57) ABSTRACT

The invention concerns a method for mounting a sprung joint for the frame of spectacles, comprising a step which consists in placing a spring pin in a first component and a step which consists in articulating the first component to a second component through a pivot pin enabling a bow of the frame, integral with one of the components, to pivot relative to a surface of the frame integral with the other component. The invention is characterised in that it consists in: opening the first component by elastic deformation, inserting the spring pin into the first component, and closing the later around the pin so as to retain it by elastic pinching against the spring compression. Preferably, the first component is forcefully opened with the pin. The method enables to simplify mounting a spring joint wherein the pin is permanently retained in the first component even if the pivot pin is lost.

24 Claims, 4 Drawing Sheets

A-A

METHOD FOR FITTING A RESILIENT HINGE OF A SPECTACLE FRAME AND RESILIENT HINGE DESIGNED FOR IMPLEMENTATION OF THIS METHOD

CROSS REFERENCE TO RELATED APPLICATIONS

This application is a Continuation application of PCT/IB01/00614 filed Apr. 12, 2001, which claimed priority of European Application No. 00.420074.7 filed Apr. 14, 2000, entitled "Method for Fitting a Resilient Hinge of a Spectacle Frame and Resilient Hinge Designed for Implementation of this Method" all of which are included in their entirety by reference made hereto.

BACKGROUND OF THE INVENTION

1. Field of the Invention

The invention relates to a method for fitting a resilient hinge of a spectacle frame and to a resilient hinge which is designed for implementation of such a method.

More particularly, the invention relates to a method for fitting a resilient hinge of a spectacle frame, comprising a step for putting a spring thruster into place in a first component and a step for articulating the first component on a second component via a rotational shaft. The fitting is such that an arm of the frame, which is integral with one of the components, is pivoted relative to a surface of the frame which is integral with the other component by displacing the thruster in translation in the first component against the compression of the spring.

2. Description of the Related Art

In this well-known type of fitting, the thruster is thrust against the compression of the spring in order to articulate the two components with the rotational shaft. The removal or loss of the rotational shaft releases the thruster, which escapes from the first component by means of the relaxation of the spring. There is therefore a risk of losing the thruster and the spring, since it is understood that these parts have small dimensions.

In order to eliminate this disadvantage, document FR 2 519 434 published on Jul. 8, 1983 describes a method for fitting a resilient hinge for a spectacle frame wherein, after the step of putting the thruster into place, a the thruster in the first component against the compression of the spring. This pin is withdrawn after the step of articulation of the components by means of the rotational shaft. In other words, this arrangement is designed to retain the thruster temporarily during fitting or removal of the resilient hinge. In the event of loss of the rotational shaft during use of the frame, the thruster escapes from the first component by means of the relaxation of the compression spring.

Document FR 2 334 808 published on Jul. 8, 1977 describes a method for fitting a resilient hinge for an optical frame, wherein the thruster and the spring are introduced into a case and the case is fitted in hot conditions into a first component of the frame before the latter is articulated on a second component via a rotational shaft. The step by means of which the case is rendered integral with the first component is necessary in order to close the case and thus to prevent the thruster permanently from escaping in the event of withdrawal or loss of the rotational shaft. In addition, a separate case of the first component complicates the design of the resilient hinge itself.

Document U.S. Pat. No. 5,515,575 published on May 14, 1996 describes another method for fitting a resilient hinge of a spectacle frame, which makes it possible to retain the thruster permanently in one of the components of the hinge. According to this document, the thruster is put into place by being made to slide into an aperture in the component, against the compression of the spring. During this step, it is necessary to introduce lugs of the thruster in corresponding grooves in the aperture in the component. Then the thruster is subjected to rotation of 90° for example, in order to offset the lugs relative to the grooves, such that the thruster is retained permanently in the component. Putting the thruster into place in the thruster. A thruster which is provided with lugs and a component which has an aperture provided with corresponding grooves in this case also complicate the design of the resilient hinge itself.

BRIEF SUMMARY OF THE INVENTION

One of the objects of the invention is to provide simplification in comparison with the known methods for fitting a resilient hinge of a spectacle frame, one of the components of which comprises a spring thruster. More particularly the invention relates to simplification of the step of putting the thruster into place in the component, taking into account the requirement to retain the thruster permanently in the component. The invention also relates to a method which provides simplification during removal of the resilient hinge. The invention further relates to a method for fitting a resilient hinge which provides simplification of the design of the hinge itself, in particular relative to the thruster and the component in which it is put into place.

For this purpose, the invention relates to a method for fitting a resilient hinge of a spectacle frame, comprising a step for putting a spring thruster into place in a first component and a step for articulating the first component on a second component via a rotational shaft, such that an arm of the frame, which is integral with one of the components, pivots relative to a surface of the frame which is integral with the other component by displacing the thruster in the first component against the compression of the spring, characterised in that the first component is opened by resilient deformation, the spring thruster is introduced into the first component, and the latter is closed around the thruster such as to retain the latter by resilient gripping against the compression of the spring.

According to this method the component closes as a resilient gripper around the thruster such as to keep the latter abutted against the compression of the spring. It will be appreciated that the first component can be closed by resilient gripping around the thruster when the latter is introduced sufficiently far into the first component. After the introduction of the thruster into the component it is not necessary to impose additional rotation of the thruster relative to the component in order to prevent the thruster from escaping from the latter. The design of the thruster is therefore simpler, since it is not necessary to provide means for retention on the thruster itself. In addition, the thruster is retained permanently by the component in which it is put into place, without making it necessary to fit the thruster into a case and to close the latter by securing it to the component.

According to an advantageous embodiment of the invention, the first component is forced open by the thruster until this component closes by means of resilient gripping around the thruster. This embodiment simplifies further the fitting of the resilient hinge by making the thruster act as a resilient deformation tool for the first component.

Other advantages of the invention will become apparent from reading the description of two embodiments illustrated by the drawings.

DETAILED DESCRIPTION OF THE INVENTION

Figure 1A:
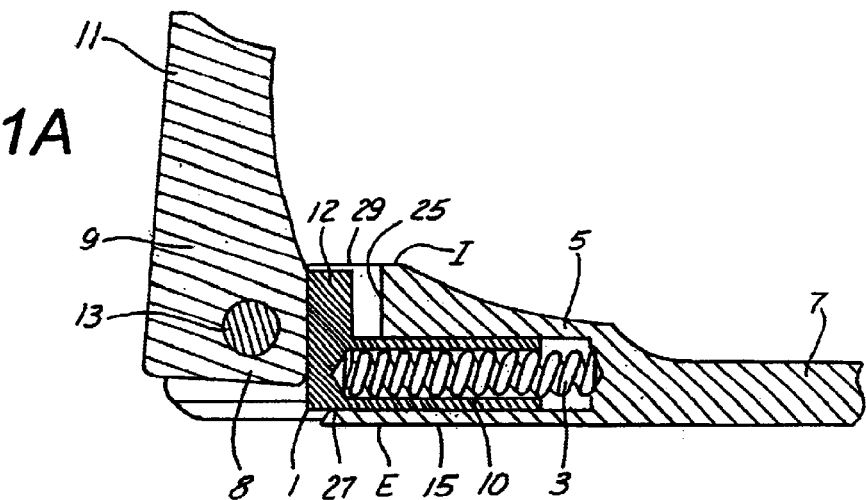
FIGS. 1A to 1C illustrate a resilient hinge of a spectacle frame according to the invention, respectively when an arm of the frame is in the closed position, in a position of normal opening, and in a position of opening beyond the position of normal opening.
Figure 1B:
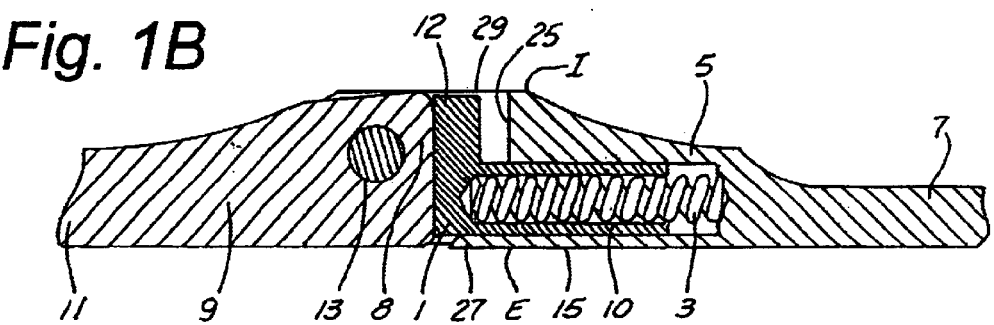
Figure 1C:
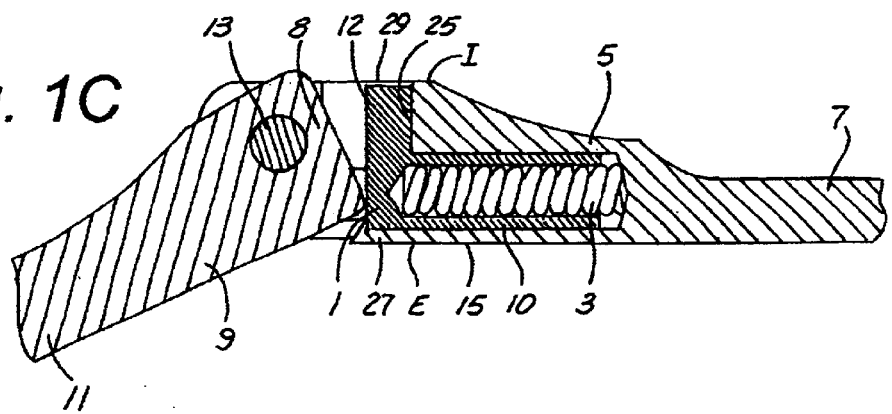

A resilient hinge for a spectacle frame comprises, FIGS. 1A to 1C, a first 5 and a second 9 component which are articulated by a rotational shaft 13. A spring 3 thruster 1 is disposed in the first component 5 such that an arm 11 of the frame which is integral with one 9 of the two components pivots relative to an opposite tenon 7 which is integral with the other component 5 in displacing the thruster 1 in translation in the first component 5 against the compression of the spring 3.

In a well-known manner the second component 9 has a knuckle 8 in the form of a cam in order for the compression of the spring to be subjected to a maximum level when the arm pivots from a position of closure illustrated in FIG. 1A to a position of normal opening illustrated in FIG. 1B. Thus, the thruster tends to return the arm to the positions respectively of closure and normal opening when the pivoting is respectively before and after the pivoting which corresponds to the maximal compression of the spring. As illustrated in FIG. 1C, the form of a cam of the knuckle 8 of the second component 9 also makes it possible for the thruster to return the arm to the positron of normal opening when it is actuated by being pivoted beyond this position.

A method for fitting the hinge previously described comprises a step for putting the spring 3 thruster 1 into place in the first component 5 and a step for articulating the first component 5 on the second component 9 via a rotational shaft 13.

According to the invention, the first component 5 is opened by means of resilient deformation, the spring 3 thruster 1 is introduced into the first component 5, and the latter 5 is closed around the thruster 1 such as to retain it by resilient gripping against the compression of the spring 3.

Figures 2A, 2B, 2C, 2D:
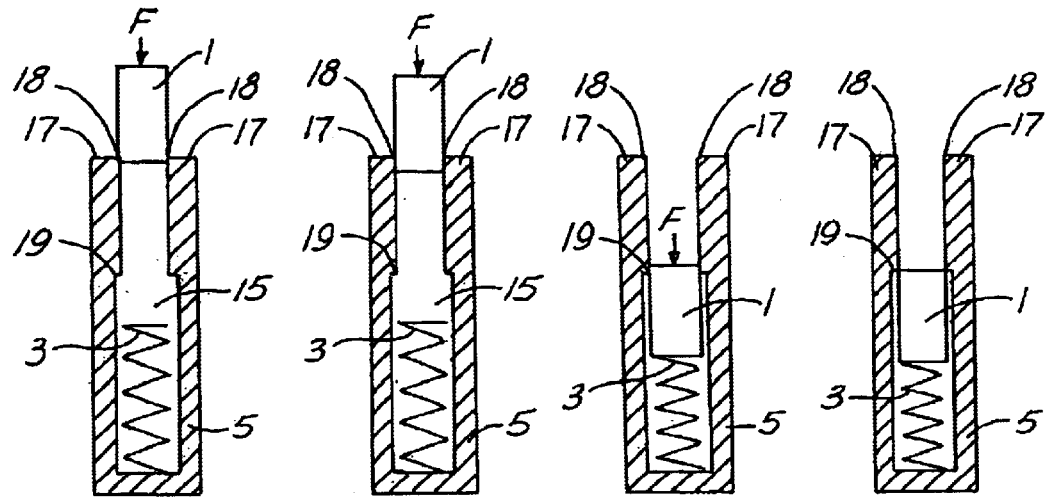
FIGS. 2A to 2D illustrate a step of a method according to the invention which makes it possible to put a spring thruster into place in one of the two components of the resilient hinge.

In the embodiment of the invention illustrated in FIGS. 2A to 2D, the first component 5 is forced open by the thruster 1 until this component 5 closes by means of resilient gripping around the thruster. More particularly, in FIG. 2A, the spring 3 is disposed in a receptacle 15 of the first component 5 and the thruster 1 is disposed supported on two knuckles 17 of the first component 5. The receptacle 15 opens onto the space which separates the two knuckles 17, which project relative to the receptacle 15. A force F, in FIG. 2B, is applied to the thruster 1 in order to part the two knuckles 17 and the receptacle 15, in other words to open the first component 5 by resilient deformation. Then, in FIG. 2C, the thruster is introduced into the receptacle 15 until the latter closes onto the thruster 1 by resilient gripping and therefore, in figure 2D, the receptacle retains the thruster in the first component 5 against the compression of the spring 3.

As can be seen in FIG. 2D, the thruster 1 is permanently retained in the first component 5 of the hinge, even when the two components 5 and 9 are not articulated by the rotational shaft 13. In the event of removal or loss of the first component 5. In addition, the thruster 1 can be removed easily by opening the first component 5 slightly by means of resilient deformation.

Figures 3A, 3B, 3C:
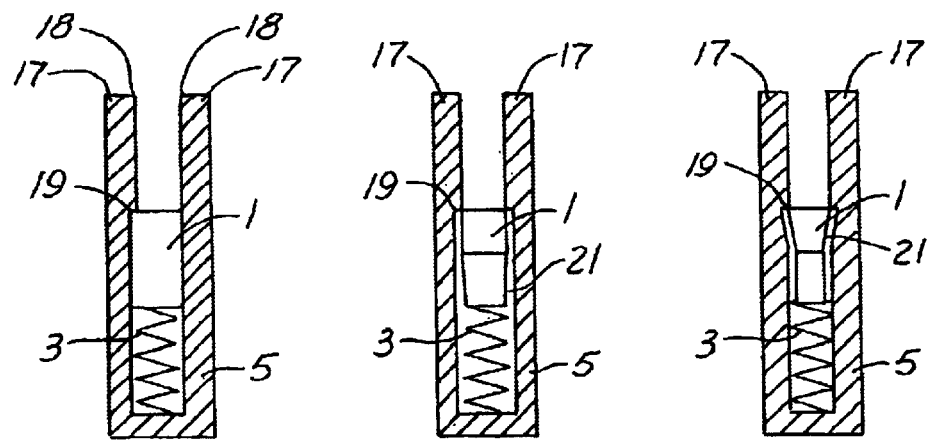
FIGS. 3A to 3C illustrate different forms of the component and of the thruster of a resilient hinge which is designed to be fitted according to the method for fitting illustrated by FIGS. 2A to 2D.

In a resilient hinge of a spectacle frame which is designed to be fitted according to the method of the invention, the receptacle 15 of the first component 5 is deformed resiliently when the thruster 1 is introduced into this receptacle 15, which, as can be seen in FIG. 2A or 3A, has one or two kinks 19 which form a retention stop for the thruster 1 against the compression of the spring 3 when the first component 5 and the receptacle 15 close resiliently around the thruster 1.

Preferably, as can be seen in FIG. 3B, the thruster 1 has a chamfer 21 in order to facilitate opening of the first component 5 by resilient deformation. A chamfer 18 is also formed on each knuckle 17 of the first component 5 in order to facilitate opening of the latter by resilient deformation during introduction of the thruster 1.

A corresponding shape can also be provided between the kinks 19 of the first component 5 and the chamfer 21 of the thruster 1, as can be seen in FIG. 3C. This arrangement facilitates creation of the receptacle 15.

On completion of the step of putting the thruster 1 into place in the first component 5, the thruster 1 is thrust against the compression of the spring 3 by means of the second component 9 in order to align the bores in the knuckles 17 and 8 of the two components and to insert the rotational shaft 13 which permits articulation of the two components.

Preferably, the bore in the knuckles 17 of the first component 5 is spaced from the kink(s) 19 of the receptacle 15, such as to limit axial offsetting of the bore in the knuckle 8 of the second component 9 and therefore to limit the compression of the spring 3 when the bores are aligned. This limitation is such that it makes it possible to articulate the two components 5 and 9 by means of a screw 13, without needing to force the thruster 1 back in advance by means of the second component 9. When the two components 5 and 9 are articulated by the screw 13, the thruster 1 is prestressed by the spring 3 and exerts contact pressure permanently on the knuckle 8 of the second component 9.

Figure 4A:
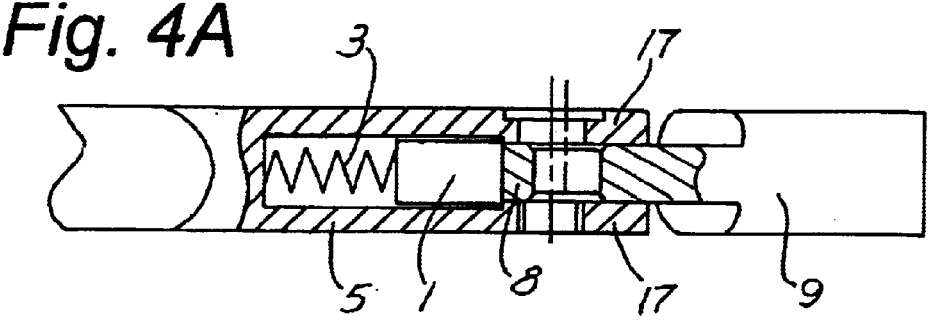
FIGS. 4A to 4D illustrate a step of a method according to the invention which makes it possible to articulate a first component on a second component by means of a rotational shaft.
Figure 4B:
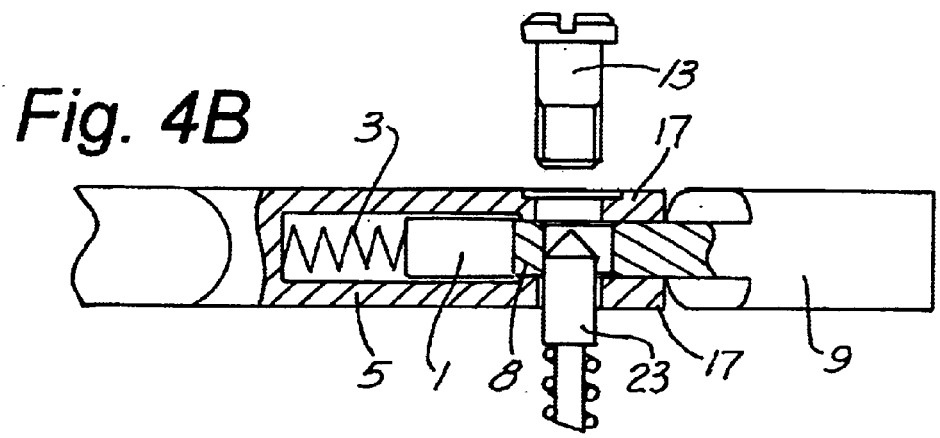
Figure 4C:
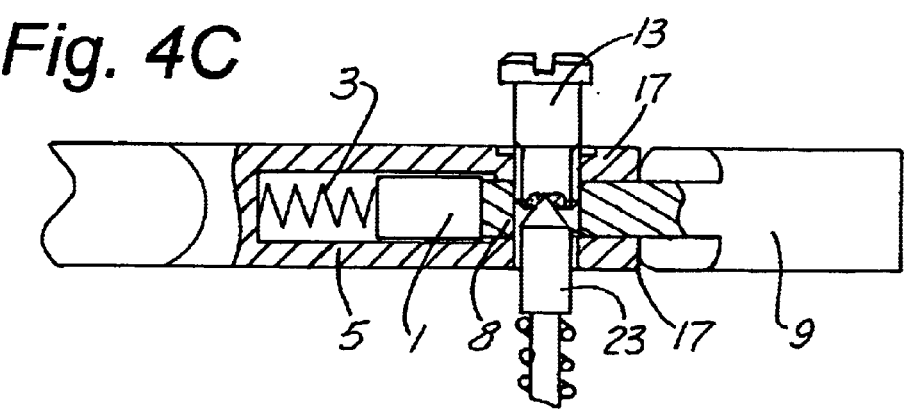
Figure 4D:
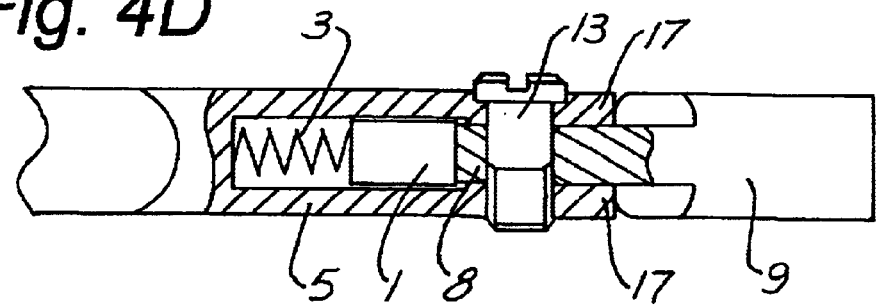

FIGS. 4A to 4D illustrate the step of articulation of the two components 5 and 9. FIG. 4A illustrates more particularly slight offsetting between the bores in the knuckles 17 of the first component 5 and in the knuckle 8 of the second component 9, whereas the latter does not exert any pressure on the thruster 1 against the spring 3. FIGS. 4B and 4C illustrate the alignment of the bores by means of a point 23 and the insertion of an articulation screw 13. FIG. 4D illustrates full insertion and screwing of the screw 13 into one of the knuckles 17 of the first component 5.

The articulation screw 13 can be replaced by a shaft which is provided with a head at one end and a chamfer at the opposite end in order to align the bores in the knuckles of the two components without using an additional point. The end opposite the head is then deformed by a riveting technique. This end can also be welded to the first component of the hinge.

According to another embodiment of the invention, the first component 5 has a receptacle 15 which receives a longitudinal part 10 of the thruster 1 whilst being offset relative to the rotational shaft 13 and open 29 in order to receive a transverse part 12 of the thruster 1 which is pressed against the second component 9 by the compression of the spring 3.

Figure 5A:
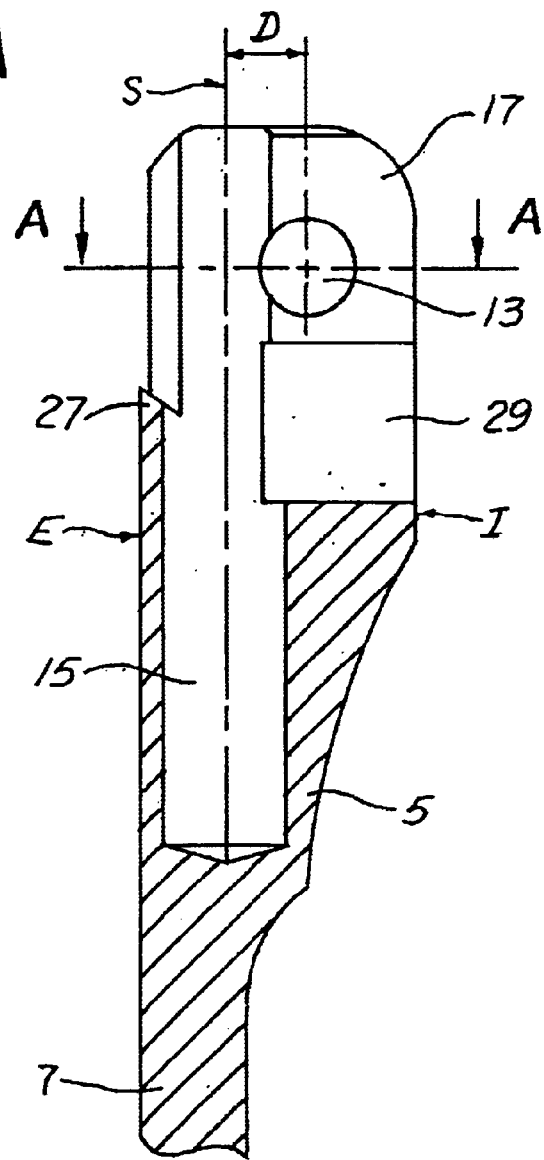
FIGS. 5A and 5B illustrate on two different cross-sectional planes the one of the components of the resilient hinge represented in FIGS. 1A to 1C which receives a spring thruster.
Figure 5B:
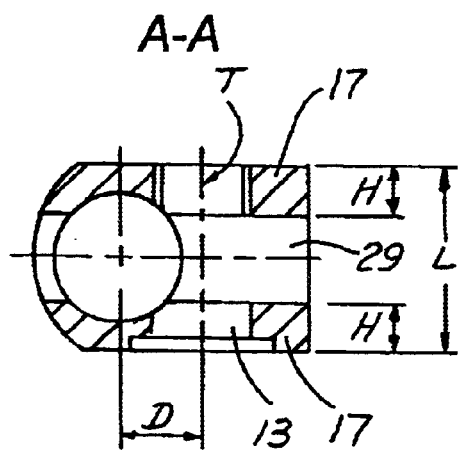

As can be seen clearly in FIGS. 5A and 5B, the axial direction S of the receptacle 15 is offset by a distance D relative to the axial direction of the bore T in two knuckles 17 of the first component 5 which receives the rotational shaft 13. The offsetting D makes it possible to thread the bore in the first component along all, or less than all if required, of the thickness H of the knuckles 17, without needing to compensate for a loss of thickness of thread caused by machining of the receptacle 15. This therefore contributes towards reducing the total width L of the first component parallel to the rotational shaft 13.

As can be seen in FIGS. 1A to 1C and 5A, the receptacle 15 of the first component 5 is preferably closed on one side E and receives the transverse part 12 of the thruster 1 only via an aperture 29 in the opposite side I, the thruster then having the shape of an "L".

The lateral closure of the first component 15 is obtained by means of a wall 27 of the receptacle 15 which guides the longitudinal part 10 of the thruster 1 and is extended in the continuity of the knuckle 8 of the second component 9 when the arm is in the position of normal opening, as illustrated by FIG. 1B. If the guiding wall 27 is disposed on the side E of the first component which corresponds to the outer side of the frame, i.e. the side which is seen by a third party when the frame is worn by a user, the thruster 1 can no longer be seen from this outer side when the arm is in the position of normal opening. This therefore adds to the general aesthetic attraction of the spectacle frame.

The thruster in the shape of an "L" is obtained from a section in the form of a lock which is machined around the longitudinal part 10, whilst offsetting the axis of turning relative to the axis of the section. The thruster can be bored in order to receive the spring and thus reduce the proportion of the receptacle of the first component in the longitudinal direction S.

It is advantageous to assemble the spring and the thruster such as to form a mechanism in a single piece. A stepped bore can be provided in the thruster, the diameter of the bore being smaller than the diameter of the spring along a short length. In the case of a full thruster, a stud is produced, the diameter of which is larger than the diameter of the core of the spring.

It should be noted that the receptacle 15 of the first component can be open on both sides E and I in order to receive a thruster 1, the longitudinal 10 and transverse 12 parts of which form a T.

It should also be noted that in the embodiments 1A to 1C, the first component 5 comprises a rear stop 25 to limit the compression of the spring 3 during pivoting of the arm 11 relative to the opposite tenon 7 of the frame.

What is claimed is:

1. A Method for fitting a resilient hinge of a spectacle frame, comprising a first step for putting a spring (3) thruster (1) into place in a first component (5) of a resilient hinge comprising a receptacle (15) which is designed to receive the spring (3) thruster (1) and two knuckles (17) which project relative to the receptacle (15) and a second step for articulating the first component (5) on a second component (9) of said resilient hinge via a rotational shaft (13), characterised in that to perform the first step, the first component (5) is opened by resilient deformation by moving the two knuckles (17) and the receptacle (15) apart and the spring (3) thruster (1) is introduced into the receptacle (15) of the first component (5) until the receptacle (15) closes around the thruster (1) such as to retain the latter by resilient gripping against the compression of the spring (3).

2. A method for fitting according to claim 1, wherein the first component (5) is forced open by means of the thruster (1).

3. A resilient hinge of a spectacle frame which is designed to be fitted according to the fitting method of claim 2, comprising a first (5) and a second (9) component which are articulated via a rotational shaft (13) such that an arm (11) of the frame, which is integral with one (9) of the components, is pivoted relative to a surface of the frame which is integral with the other component by displacing a spring (3) thruster (1) which is disposed in a receptacle (15) of the first component (5) against the compression of a spring (3), the first component comprising two knuckles (17) which project relative to the receptacle (15), characterised in that the two knuckles (17) and the receptacle (15) move apart in order to open the first component (5) resiliently when the thruster (1) is introduced into this receptacle, which is provided with one or two kinks (19) which form a retention stop for the thruster (1) against the compression of the spring (3) when the receptacle (15) of the first component (5) closes by resilient gripping around the thruster (1).

4. A resilient hinge according to claim 3, wherein the thruster (1) has a chamfer (21) to facilitate opening of the first component (5) by resilient deformation.

5. A resilient hinge according to claim 4 wherein the kinks (19) of the first component (5) and the chamfer (21) of the thruster (1) have a corresponding shape.

6. A resilient hinge according to claim 5, wherein the receptacle (15) is closed on one side (E) of the first component which corresponds to the side of the frame which is seen by a third party when the frame is worn by a user.

7. A resilient hinge according to claim 3, wherein the first component (5) has chamfers (18) to facilitate its opening by resilient deformation.

8. A resilient hinge according to claim 7, wherein the receptacle (15) of the first component (5) is closed on one side (E) and receives the transverse part (12) of the thruster (1) only via an aperture (29) in the opposite side (I), the thruster (10,12) having the shape of an "L".

9. A resilient hinge according to claim 3 wherein the kinks (19) of the first component (5) and the chamfer (21) of the thruster (1) have a corresponding shape.

10. A resilient hinge according to claim 9, wherein the receptacle (15) is closed by a wall (27) of the receptacle (15) which guides the longitudinal part (10) of the thruster (1) and is extended in the continuity of the second component (9) when the arm (11) is in the position of normal opening.

11. A resilient hinge according to claim 9, wherein the receptacle (15) is closed on one side (E) of the first component which corresponds to the side of the frame which is seen by a third party when the frame is worn by a user.

12. A resilient hinge according to claim 3, wherein a bore in the first component (5) for the rotational shaft (13) is spaced from the kink(s) (19) of the receptacle (15), such as to limit axial offsetting relative to a bore for the rotational shaft (13) of the second component (9).

13. A resilient hinge according to claim 3, wherein the first component (5) has a receptacle (15) which receives a longitudinal part (10) of the thruster (1) whilst being offset relative to the rotational shaft (13) and open (29) in order to receive a transverse part (12) of the thruster (1) which is pressed against the second component (9) by the compression of the spring (3).

14. A resilient hinge of a spectacle frame which is designed to be fitted according to the fitting method of claim 1, comprising a first (5) and a second (9) component which are articulated via a rotational shaft (13) such that an arm (11) of the frame, which is integral with one (9) of the components, is pivoted relative to a surface of the frame which is integral with the other component by displacing a spring (3) thruster (1) which is disposed in a receptacle (15) of the first component (5) against the compression of a spring (3), the first component comprising two knuckles (17) which project relative to the receptacle (15), characterised in that the two knuckles (17) and the receptacle (15) move apart in order to open the first component (5) resiliently when the thruster (1) is introduced into this receptacle, which is provided with one or two kinks (19) which form a retention stop for the thruster (1) against the compression of the spring (3) when the receptacle (15) of the first component (5) closes by resilient gripping around the thruster (1).

15. A resilient hinge according to claim 14, wherein the thruster (1) has a chamfer (21) to facilitate opening of the first component (5) by resilient deformation.

16. A resilient hinge according to claim 15 wherein the kinks (19) of the first component (5) and the chamfer (21) of the thruster (1) have a corresponding shape.

17. A resilient hinge according to claim 16, wherein the receptacle (15) is closed by a wall (27) of the receptacle (15) which guides the longitudinal part (10) of the thruster (1) and is extended in the continuity of the second component (9) when the arm (11) is in the position of normal opening.

18. A resilient hinge according to claim 16, wherein the receptacle (15) is closed on one side (E) of the first component which corresponds to the side of the frame which is seen by a third party when the frame is worn by a user.

19. A resilient hinge according to claim 14, wherein the first component (5) has chamfers (18) to facilitate its opening by resilient deformation.

20. A resilient hinge according to claim 14 wherein the kinks (19) of the first component (5) and the chamfer (21) of the thruster (1) have a corresponding shape.

21. A resilient hinge according to claim 20, wherein the receptacle (15) of the first component (5) is closed on one side (E) and receives the transverse part (12) of the thruster (1) only via an aperture (29) in the opposite side (I), the thruster (10,12) having the shape of an "L".

22. A resilient binge according to claim 14, wherein a bore in the first component (5) for the rotational shaft (13) is spaced from the kink(s) (19) of the receptacle (15), such as to limit axial offsetting relative to a bore for the rotational shaft (13) of the second component (9).

23. A resilient hinge according to claim 22, wherein the receptacle (15) is closed on one side (E) of the first component which corresponds to the side of the frame which is seen by a third party when the frame is worn by a user.

24. A resilient hinge according to claim 14, wherein the first component (5) has a receptacle (15) which receives a longitudinal part (10) of the thruster (1) whilst being offset relative to the rotational shaft (13) and open (29) in order to receive a transverse part (12) of the thruster (1) which is pressed against the second component (9) by the compression of the spring (3).

* * * * *